US012282601B2

(12) United States Patent
Takehara

(10) Patent No.: US 12,282,601 B2
(45) Date of Patent: Apr. 22, 2025

(54) OPERATION CONTROL DEVICE, OPERATION CONTROL METHOD, AND COMPUTER-READABLE STORAGE MEDIUM

(71) Applicant: JVCKENWOOD Corporation, Yokohama (JP)

(72) Inventor: Yuya Takehara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/441,004

(22) Filed: Feb. 14, 2024

(65) Prior Publication Data
US 2024/0184363 A1    Jun. 6, 2024

Related U.S. Application Data

(63) Continuation of application No. PCT/JP2022/023989, filed on Jun. 15, 2022.

(30) Foreign Application Priority Data

Sep. 1, 2021 (JP) .................................. 2021-142710

(51) Int. Cl.
G06F 3/01 (2006.01)
B25J 13/08 (2006.01)

(52) U.S. Cl.
CPC .............. *G06F 3/015* (2013.01); *B25J 13/08* (2013.01)

(58) Field of Classification Search
CPC .. G06F 3/015; G06F 3/01; B25J 13/08; G05B 11/36
See application file for complete search history.

(56) References Cited

U.S. PATENT DOCUMENTS

2006/0267995 A1* 11/2006 Radloff ............ H04N 21/47217
345/530
2012/0245713 A1* 9/2012 Chen ......................... G06F 3/01
700/83

(Continued)

FOREIGN PATENT DOCUMENTS

JP    2008-532182    8/2008
JP    2013-117957    6/2013

(Continued)

OTHER PUBLICATIONS

International Search Report and Written Opinion for International Application No. PCT/JP2022/023989 mailed on Sep. 6, 2022, 9 pages.

*Primary Examiner* — Dmitriy Bolotin
(74) *Attorney, Agent, or Firm* — Amin, Turocy & Watson, LLP

(57) ABSTRACT

An operation control device includes: a brain-information acquiring unit configured to acquire brain information of a user; a determining unit configured to determine whether the brain information acquired by the brain-information acquiring unit includes brain information corresponding to a first command representing an operation to operate an operation object and brain information corresponding to a second command representing an action to operate an operating member; and an executing unit configured to execute processing corresponding to the first command when the determining unit determines that the brain information corresponding to the first command and the brain information corresponding to the second command are acquired.

4 Claims, 3 Drawing Sheets

(56) References Cited

U.S. PATENT DOCUMENTS

| | | | |
|---|---|---|---|
| 2013/0138248 A1 | 5/2013 | Mathan et al. | |
| 2013/0158883 A1* | 6/2013 | Hasegawa | G06F 3/015 |
| | | | 702/19 |
| 2014/0333529 A1* | 11/2014 | Kim | G06F 3/015 |
| | | | 345/156 |
| 2015/0033266 A1* | 1/2015 | Klappert | H04N 21/4314 |
| | | | 725/52 |
| 2015/0290454 A1* | 10/2015 | Tyler | G06F 3/012 |
| | | | 607/134 |
| 2016/0239084 A1* | 8/2016 | Connor | A61B 5/6803 |
| 2016/0282940 A1* | 9/2016 | Hong | G06F 3/16 |
| 2018/0131866 A1 | 5/2018 | Katsumata | |
| 2021/0005104 A1* | 1/2021 | Levenberg | A61B 5/369 |
| 2021/0223864 A1* | 7/2021 | Forsland | G06F 3/016 |
| 2023/0325059 A1* | 10/2023 | Le | G06F 3/013 |
| | | | 345/156 |
| 2024/0264669 A1* | 8/2024 | Miller | G06F 3/013 |

FOREIGN PATENT DOCUMENTS

| | | |
|---|---|---|
| JP | 2016-179164 | 10/2016 |
| JP | 2018-77701 | 5/2018 |

\* cited by examiner

OPERATION CONTROL DEVICE, OPERATION CONTROL METHOD, AND COMPUTER-READABLE STORAGE MEDIUM

CROSS-REFERENCE TO RELATED APPLICATIONS

This application is a Continuation of PCT International Application No. PCT/JP2022/023989 filed on Jun. 15, 2022, which claims the benefit of priority from Japanese Patent Application No. 2021-142710 filed on Sep. 1, 2021, the entire contents of both of which are incorporated herein by reference.

BACKGROUND

The present disclosure relates to an operation control device, an operation control method, and a computer-readable storage medium.

In recent years, technology for measuring brain information has advanced, and brain-machine interfaces (BMIs), which directly connect the brain to machines, are becoming a reality. As such a technology, for example, there is one described in JP-A-2013-117957. JP-A-2013-117957 is about a technique to obtain multiple steady-state visual evoked potential signals from a user when the user is stimulated, to supply a system command signal.

In the conventional BMI systems, when executing a brainwave command, if an irrelevant stimulus is present, the irrelevant stimulus could be reflected in brain waves and executed. For example, in the case of a forward movement command in which a robot moves forward when commanding the robot to "move forward" in mind, if someone around it just says "move forward", the brain may involuntarily recall the command "move forward", leading to unintentional issuance of the forward movement command. Moreover, when operating the robot while viewing its movement, if the robot moving forward is displayed on a monitor, because the brain of the operator that sees it may autonomously continue to recall "move forward", the forward movement command is to be issued unintentionally.

SUMMARY

An operation control device according to one aspect of the present disclosure includes: a brain-information acquiring unit configured to acquire brain information of a user; a determining unit configured to determine whether the brain information acquired by the brain-information acquiring unit includes brain information corresponding to a first command representing an operation to operate an operation object and brain information corresponding to a second command representing an action to operate an operating member; and an executing unit configured to execute processing corresponding to the first command when the determining unit determines that the brain information corresponding to the first command and the brain information corresponding to the second command are acquired.

An operation control method according to another aspect of the present disclosure includes: acquiring brain information of a user; determining whether the acquired brain information includes brain information corresponding to a first command representing an operation to operate an operation object and brain information corresponding to a second command representing an action to operate an operating member; and executing processing corresponding to the first command when it is determined that the brain information corresponding to the first command and the brain information corresponding to the second command are acquired.

A non-transitory computer-readable storage medium according to still aspect of the present disclosure stores a computer program causing a computer to execute: acquiring brain information of a user; determining whether the acquired brain information includes brain information corresponding to a first command representing an operation to operate an operation object and brain information corresponding to a second command representing an action to operate an operating member; and executing processing corresponding to the first command when it is determined that the brain information corresponding to the first command and the brain information corresponding to the second command are acquired.

DETAILED DESCRIPTION

Hereinafter, embodiments of an operation control device, an operation control method, and a computer program according to the present disclosure will be explained in detail with reference to the accompanying drawings. The embodiments below are not intended to limit the present invention.

First Embodiment

Operation Control Device

Figure 1:
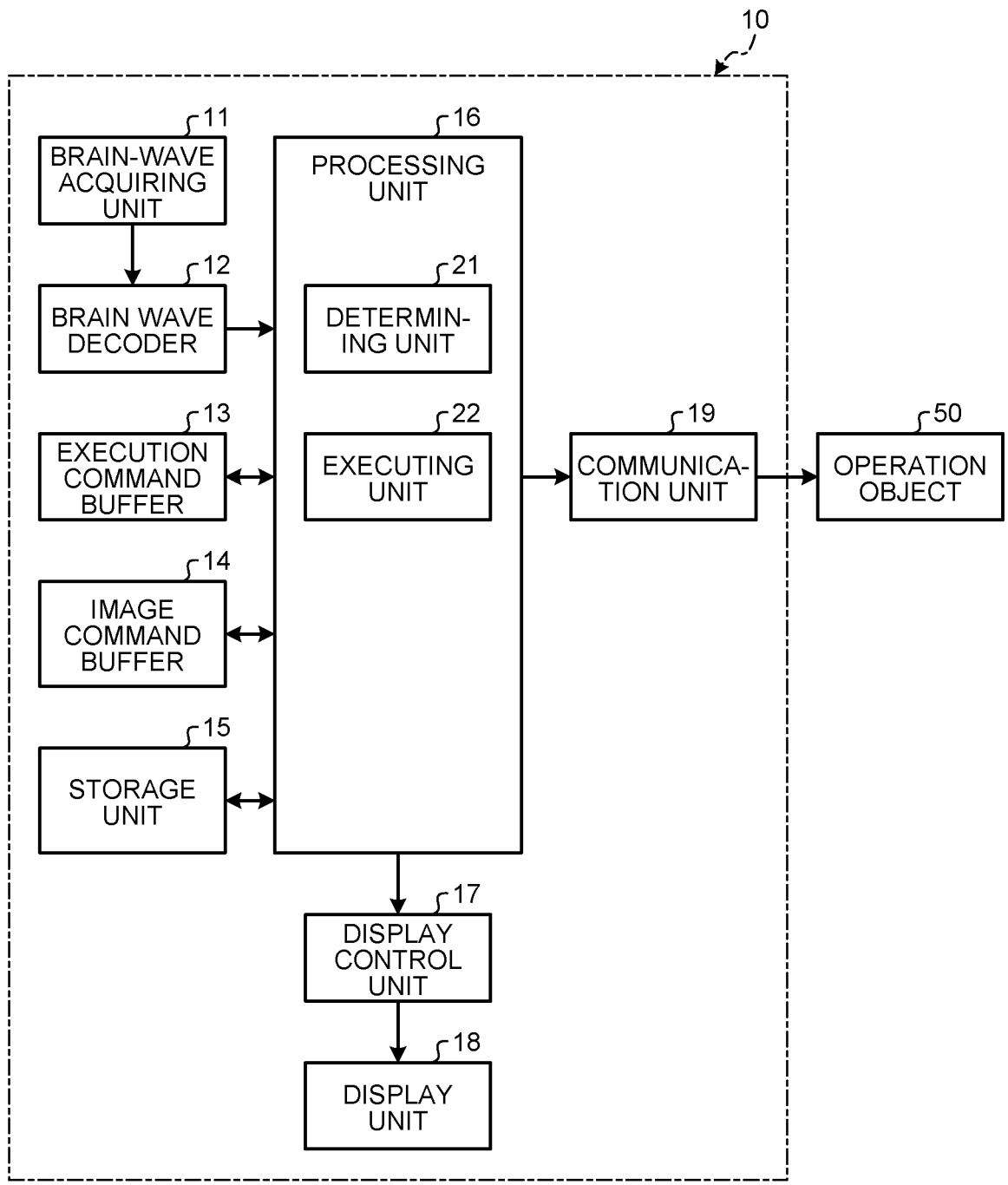
FIG. 1 is a block diagram illustrating a configuration example of an operation control device according to a first embodiment.

FIG. 1 is a block diagram illustrating a configuration example of an operation control device according to a first embodiment.

In the first embodiment, as illustrated in FIG. 1, an operation control device 10 is to control an operation object 50 based on brain information of a user. The operation control device 10 includes a brain-wave acquiring unit (brain-information acquiring unit) 11, a brain wave decoder 12, an execution command buffer 13, an image command buffer 14, a storage unit 15, a processing unit 16, a display control unit 17, a display unit 18, and a communication unit 19.

The operation object 50 is, for example, a robot, but is not limited to the robot, and may be a device activated by communication, and the like. Although not illustrated, the operation object 50 is equipped with a driving device, a control device that controls the driving device, and a communication unit capable of receiving a control signal and the like. In the operation object 50, the control device activates a robot by driving the driving device when the communication unit receives a control signal.

The brain-wave acquiring unit 11 is wearable on the head of a user. The brain wave decoder 12, the processing unit 16, the display control unit 17, the display unit 18, and the communication unit 19 may be worn by the user, or may be placed at a predetermined position without being worn. Moreover, the brain-wave acquiring unit 11, the brain wave decoder 12, the processing unit 16, the display control unit 17, the display unit 18, and the communication unit 19 may be arranged in an integrated unit, or may be arranged separately.

The brain-wave acquiring unit 11 is to acquire brain waves, which are brain information of the user. The brain-wave acquiring unit 11 includes an electric sensor (for example, electrode) that detects, for example, brain waves obtained from weak electric currents flowing in a neural network of the brain. The brain-wave acquiring unit 11 detects a potential of a weak electric current (electrical signal) based on thoughts of the user including contemplation and the like or when the user receives a stimulus from an external environment. The brain-information acquiring unit is not limited to the brain-wave acquiring unit 11. The brain-information acquiring unit may be, for example, one that acquires blood flow due to brain activity, which is brain information of a user, by near-infrared light measurement or the like. The brain-wave acquiring unit 11 is connected to the brain wave decoder 12, and transmits brain waves, which are brain information acquired from the user, to the brain wave decoder 12.

The brain wave decoder 12 restores an electrical signal of the brain waves of the user acquired by the brain-wave acquiring unit 11 to thought information of the user. In this case, electrical signals of brain waves of the user and thought information of the user are associated with each other in advance. In this case, for example, electrical signals of brain waves and thought information of a user are associated by using machine learning, such as deep learning.

The execution command buffer 13 temporarily stores a first command determined by a determining unit 21 based on the thought information of the user. The first command is a command based on brain information associated with a language system (textual information). Moreover, the first command is a command to activate the operation object 50, and is a command, such as "move forward", "move backward", "stop", "speed up", "speed down", "turn right", and "turn left". In this case, the first commands and actions of the operation object 50 are associated with each other in advance. The execution command buffer 13 can transmit and receive various kinds of data between itself and the processing unit 16.

The first command is not limited to a concept indicating an instructed action, and may be one supplemented with a numerical value or the like complementing a concept indicating an instructed action. For example, the brain wave decoder 12 may detect the strength of a brainwave as a decimal value ranging from 0 to 1 while restoring thought information of the user based on an electrical signal acquired by the brain-wave acquiring unit 11, to set the first command adding the strength (numerical value) to the thought information of the user. In this case, the numerical value of the first command is a calculation of the maximum value of torque output of the driving device equipped in the operation object 50.

The image command buffer 14 temporarily stores a second command determined by the determining unit 21 based on thought information of the user. The second command is a command based on brain information associated with a language system (textual information). Moreover, the second command is a command to decide execution of the first command. The second command corresponding to the first command is set in advance by the user, and is stored in the storage unit 15. The second command may be set by the processing unit 16, and stored in the storage unit 15, and may be notified to the user in advance. The image command buffer 14 can transmit and receive various kinds of data between itself and the processing unit 16.

The second command is an image command that represents an action to operate an operating member by a user. The operating member has a movable portion that can be operated by the user, such as a lever, a pedal, a handle, and a dial. A moving direction of the movable portion includes a linear movement direction, a rotational direction, and the like, and it may be other directions. Moreover, the operating member is configured such that the movable portion can be operated by a part of the body of the user, such as a hand and a foot. The image command as the second command is to represent an action of the user moving the movable portion of the operating member, for example, from an "ON" position to an "OFF" position, or from the "OFF" position to the "ON" position. Moreover, the image command as the second command is to represent an action of the user moving the movable portion of the operating member, for example, from a "level 0" position to a "level 1" position, or from the "level 1" position to the "level 0" position.

An image command of the movable portion of the operating member moving from the "ON" position to the "OFF" position, or an image command of moving from the "level 1" position to the "level 0" position corresponds to "stop" of the first command. On the other hand, an image command of the movable portion of the operating member moving from the "OFF" position to the "ON" position, or an image command of moving from the "level 1" position to the "level 0" position corresponds to "move forward" or "move backward" of the first command.

The storage unit 15 stores the multiple first commands (execution commands) and the multiple second commands (image commands). Moreover, the storage unit 15 may store training data obtained by training with the correlation between brainwave electrical signals and thought information of the user using machine learning. The second commands are associated with the first commands in advance.

The execution command buffer 13 and the image command buffer 14 are recording units, such as a semiconductor memory device including a random access memory (RAM) equipped in the processing unit 16, a flash memory, and the like. The storage unit 15 is constituted of a memory card, a solid state drive (SSD), an external storage device, and the like.

The processing unit 16 is an arithmetic processing device (control device) that is constituted of, for example, a central processing unit (CPU) or the like. The processing unit 16 loads a stored program to a memory, and executes a command included in the program. The processing unit 16 includes an internal memory not illustrated, and the internal memory is used for temporary storage of data in the processing unit 16. The processing unit 16 includes the determining unit 21 and an executing unit 22 as its functions. Moreover, the processing unit 16 transmits processing results to the display control unit 17 and the communication unit 19.

The determining unit 21 determines whether the thought information of the user acquired by the brain-wave acquiring unit 11 and restored by the brain wave decoder 12 is a brain wave corresponding to two different commands of the first command (execution command) and the second command (image command).

Specifically, the determining unit 21 compares the thought information of the user restored by the brain wave decoder 12 and the first command (execution command)

stored in the storage unit 15. At this time, the determining unit 21 determines that the thought information of the user is the first command when the thought information matches the first command. In this case, the determining unit 21 stores the command determined as the first command in the execution command buffer 13. On the other hand, the determining unit 21 determines that the thought information of the user is not the first command when the thought information of the user does not match the first command. In this case, the determining unit 21 does not store the command determined that it is not the first command in the execution command buffer 13. In the determination of a match between the thought information of the user restored by the brain wave decoder 12 and the first command by the determining unit 21, it is determined as a match when it is possible to determine that the thought information of the user signifies the first command, even if it is not a complete match.

Furthermore, the determining unit 21 compares the thought information of the user restored by the brain wave decoder 12 and the second command (image command) stored in the storage unit 15. At this time, the determining unit 21 determines that the thought information of the user is the second command when the thought information of the user matches the second command. The determining unit 21 stores the second command in the image command buffer 14 when the thought information of the user is determined as the second command. On the other hand, the determining unit 21 determines that the thought information of the user is not the second command when the thought information of the user does not match the second command stored in the storage unit 15. The determining unit 21 does not store the second command in the image command buffer 14 when it is determined that the thought information of the user is not the second command.

The second command is an image command representing an action to operate the operating member by the user, and the operating member is a virtual member imaged in the brain of the user. Therefore, the determining unit 21 may determine as a match when the operating member representing the second command and its operation direction match in the thought information of the user, even if it is not a complete match.

Moreover, the determining unit 21 determines whether the first command (execution command) stored in the execution command buffer 13 and the second command (image command) stored in the image command buffer 14 have associated relationship. In this case, when it is determined that the thought information of the user is a brain wave corresponding to the first command (execution command), the determining unit 21 determines whether the thought information of the user is a brain wave corresponding to the second command (image command). However, the determining unit 21 may determine whether the thought information of the user is a brain wave corresponding to the first command (execution command) when the thought information of the user is determined as the brain wave corresponding to the second command (image command).

The second command may be any kind of image, and may also be selectable from among multiple images. For example, when the first command is "move forward", the operating member as the second command may be any of a lever, a pedal, a handle, a dial, and the like, and the determining unit 21 may determine as the second command associated with the first command if the thought information of the user matches either one of the operating members.

The executing unit 22 executes processing corresponding to the first command when the determining unit 21 determines that a brain wave corresponding to the first command and a brain wave corresponding to the second command are acquired. Specifically, the executing unit 22 executes the processing corresponding to the execution command as the first command when it is determined that thought information of the user acquired first is the first command by the determining unit 21, and it is determined that thought information of the user acquired next is the second command corresponding to the first command by the determining unit 21.

However, the executing unit 22 cancels the acquired first command when predetermined waiting time, for example, three seconds, has passed since the determining unit 21 determines acquisition of the first command. Moreover, the executing unit 22 cancels the acquired first command when the processing unit 16 acquires a cancel command as thought of the user after the determining unit 21 determines acquisition of the first command. The cancel command is preset, and an electrical signal of a brain wave of the user and thought information of the user (cancel command) are associated in advance, and stored in the storage unit 15. The cancel command is, for example, a symbol or a concept different from the first command, such as "x" and "cancel".

To the display control unit 17, the display unit 18 is connected. The display control unit 17 transmits a processing result transmitted from the processing unit 16 to the display unit 18, to display it. The display control unit 17 displays an operation state of the operation control device 10, which is the processing result of the processing unit 16, or a thought instruction to the user on the display unit 18.

The display unit 18 displays the operation state of the operation control device 10 and a thought instruction to the user transmitted from the display control unit 17. The display unit 18 presents necessary information to the user. The display unit 18 is, for example, a display including a liquid crystal display (LCD), an organic electroluminescence (EL) display, or the like.

The communication unit 19 is capable of wireless communication with the operation object 50. The communication unit 19 transmits processing information processed by the processing unit 16 to the operation object 50. Specifically, when the determining unit 21 determines that a brain wave corresponding to the first command and a brain wave corresponding to the second command are acquired, the executing unit 22 generates a control signal corresponding to processing of the first command to send to the communication unit 19. The communication unit 19 transmits the control signal corresponding to the processing of the first command to the operation object 50. Receiving the first command transmitted by the communication unit 19, the operation object 50 operates according to the processing of the first command.

Operation Control Method

Figure 2:
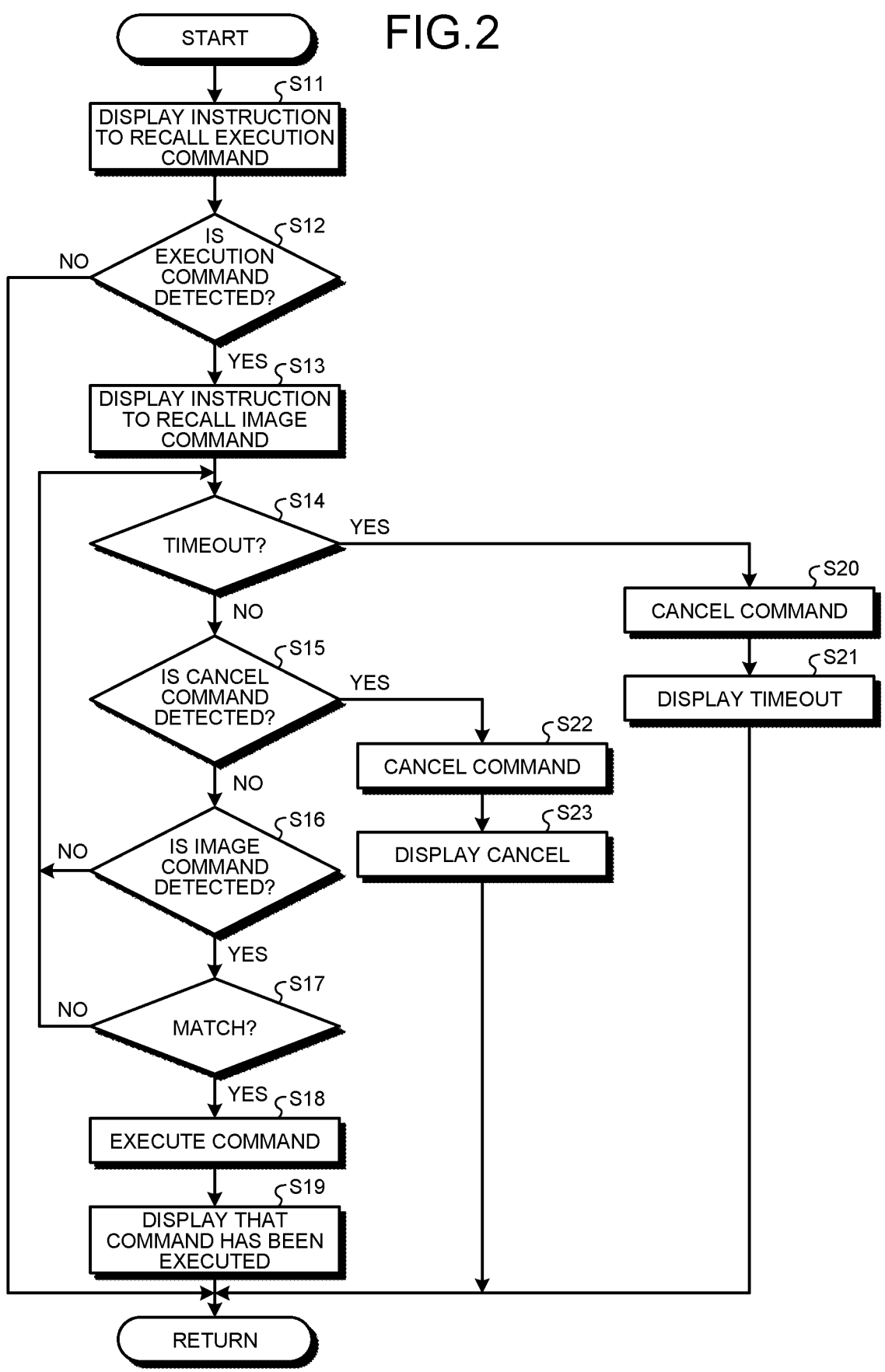
FIG. 2 is a flowchart illustrating a flow of processing of the operation control device according to the first embodiment.

An operation control method performed by the operation control device 10 will be explained. FIG. 2 is a flowchart illustrating a flow of processing of the operation control device according to the first embodiment.

As illustrated in FIG. 1 and FIG. 2, at step S11, the processing unit 16 controls the display control unit 17, to cause the display unit 18 to display an instruction to recall the first command (execution command) to the user. The display control unit 17 displays a message instructing to recall the first command representing an operation, such as "please recall the first command", on the display unit 18.

At step S12, the determining unit 21 determines whether the thought information of the user acquired by the brain-wave acquiring unit 11 and restored by the brain wave decoder 12 is a brain wave corresponding to the first command (execution command). The determining unit 21 compares the thought information of the user restored by the brain wave decoder 12 and the first command stored in the storage unit 15, and exits this routine if it is determined that the thought information of the user does not match the first command (NO), determining that the thought information of the user is not the first command. On the other hand, the determining unit 21 determines the thought information of the user as the first command when it is determined that the thought information of the user matches the first command stored in the storage unit 15 (YES), and the determining unit 21 stores the first command in the execution command buffer 13 determining that the thought information of the user is the first command, and shifts to step S13.

At step S13, the processing unit 16 controls the display control unit 17, to display an instruction to recall the second command (image command) to the user on the display unit 18. The display control unit 17 displays, for example, a message instructing to recall the first command representing an operation, such as "please recall the second command", on the display unit 18. The user recalls the second command in response to the display on the display unit 18. For example, when the operation object 50 is to be moved forward, an operation to move the movable portion of the operating member from the "OFF" position to the "ON" position is imaged.

At step S14, the processing unit 16 determines whether a timeout has occurred as predetermined waiting time has passed since the determining unit 21 determines acquisition of the first command. When it is determined that a timeout has occurred (YES), the processing unit 16 cancels the acquired first command at step S20. At step S21, the processing unit 16 displays that the first command is canceled on the display unit 18 to the user by controlling the display control unit 17. The display control unit 17 displays a message indicating timeout, such as "it has timed out", on the display unit 18.

When it is determined that a timeout has not occurred (NO), the processing unit 16 determines whether a brain wave corresponding to the cancel command is detected at step S15. When it is determined that a brain wave corresponding to the cancel command is detected (YES), the processing unit 16 cancels the acquired first command at step S22. At step S23, the processing unit 16 displays that the first command is canceled on the display unit 18 to the user by controlling the display control unit 17. The display control unit 17 displays a message indicating that the first command is canceled, such as "the first command is canceled", on the display unit 18.

On the other hand, when the processing unit 16 determines that a brain wave corresponding to the cancel command is not detected (NO), the determining unit 21 determines whether a brain wave corresponding to the second command (image command) is detected at step S16. That is, the determining unit 21 determines, for example, whether a brain wave of an image of an operation of moving the movable portion of the operating unit from the "OFF" position to the "ON" position by the user is detected. The determining unit 21 compares the thought information of the user restored by the brain wave decoder 12 and the second command stored in the storage unit 15, and when it is determined that the thought information of the user does not match the second command (NO), returns to step S14 and continues the processing.

On the other hand, when it is determined that the thought information of the user matches the second command stored in the storage unit 15 (YES), the determining unit 21 determines the thought information of the user as the second command, and stores the determined second command in the image command buffer 14. That is, when a brain information of an image representing an action of moving the movable portion of the operating member from the "OFF" position to the "ON" position by the user is detected, the determining unit 21 stores the detected second command in the image command buffer 14. Furthermore, at step S17, the determining unit 21 determines whether the first command determined at step S12 and stored in the execution command buffer 13, and the second command determined at step S16 and stored in the image command buffer 14 are the first command and the second command, the relevance of which is associated in advance. When the determining unit 21 determines that the first command and the second command are not associated (NO), it returns to step S14. When the determining unit 21 determines that the first command and the second command are associated (YES), it shifts to step S18.

At step S18, the executing unit 22 executes processing corresponding to the first command. That is, the executing unit 22 transmits a control signal corresponding to the processing of the first command to the operation object 50 by the communication unit 19, to actuate the operation object 50. At step S19, the processing unit 16 displays that the first command has been executed on the display unit 18 to the user by controlling the display control unit 17. The display control unit 17 displays a message indicating that the first command has been executed, such as "the speed-up command is executed", on the display unit 18.

Second Embodiment

Figure 3:
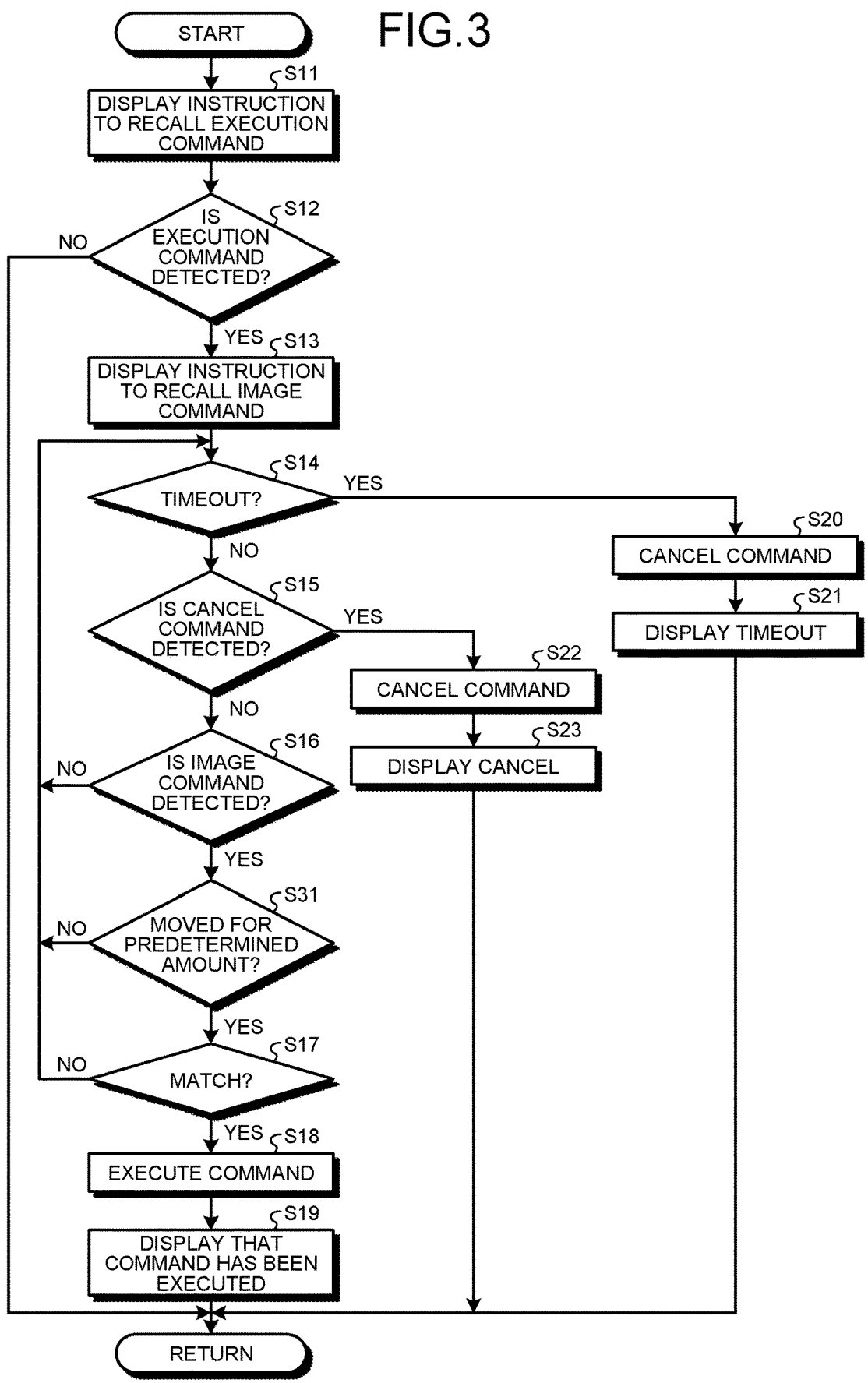
FIG. 3 is a flowchart illustrating a flow of processing of an operation control device according to a second embodiment.

FIG. 3 is a flowchart illustrating a flow of processing of an operation control device according to a second embodiment. The basic structure of the second embodiment is similar to the first embodiment described above, and it will be explained using FIG. 1. Identical reference symbols are assigned to components having functions similar to those in the first embodiment described above, and detailed explanation thereof is omitted.

In the second embodiment, as illustrated in FIG. 1, the operation control device 10 is to control operation of the operation object 50 based on brain information of a user. The operation control device 10 includes the brain-wave acquiring unit 11, the brain wave decoder 12, the execution command buffer 13, the image command buffer 14, the storage unit 15, the processing unit 16, the display control unit 17, the display unit 18, and the communication unit 19. The brain-wave acquiring unit 11, the brain wave decoder 12, the execution command buffer 13, the image command buffer 14, the display control unit 17, the display unit 18, and the communication unit 19 are similar to those of the first embodiment, and explanation thereof is omitted.

The storage unit 15 stores the multiple first commands and the multiple second commands (image commands). The first command is, as described previously, an execution command representing an operation of the operation object 50. The second command is a command to decide execution of the first command.

The second command is an image command that represents an action to operate an operating member by a user. The image command as the second command is a command representing an action to operate the movable portion of the operating member more than a predetermined amount set in advance. The image command as the second command is to represent an action of the user moving the movable portion of the operating member, for example, from a "0" position to a "forward" position, or from the "0" position to a "backward" position. In this case, the moving direction from the "0" position to the "forward" position and the moving direction from the "0" position to the "backward" position of the movable portion are the opposite directions. Additionally, a dead zone (play) is set between the "0" position and the "forward" position and between the "0" position and the "backward" position.

That is, when the movable portion is moved from the "0" position to the "forward" position, an action of the operating member in which the movable portion moves for 25% or more of a distance between the "0" position and the "forward" position is set as the image command. Moreover, when the movable portion is moved from the "0" position to the "backward" position, an action of the operating member in which the movable portion moves for 25% or more of a distance between the "0" position and the "backward" position is set as the image command. The image command that the movable portion of the operating member moves from the "0" position to the "forward" position is associated with "move forward" of the first command. On the other hand, the image command that the movable portion of the operating member moves from the "0" position to the "backward" position is associated with "move backward" of the first command.

When the movable portion is moved from the "forward" position to the "0" position, an action of the operating member in which the movable portion moves for 25% or more of a distance between the "forward" position and the "0" position is set as the image command. Moreover, when the movable portion is moved from the "backward" position to the "0" position, an action of the operating member in which the movable portion moves for 25% or more of a distance between the "backward" position and the "0" position is set as the image command. The image command that the movable portion of the operating member moves from the "forward" position to the "0" position and the image command that the movable portion of the operating member moves from the "backward" position to the "0" position are associated with "stop" of the first command.

In this case, as the second command (image command), the amount of the dead zone (play), that is, a predetermined amount for which the movable portion of the operating member moves, may be set appropriately according to a form of the operating member. Moreover, as the second command (image command), the amount of the dead zone (play), that is, a predetermined amount for which the movable portion of the operating member moves, is notified to the user in advance.

The distance for which the movable portion moves may be detected as a moving amount or a moving speed of the operation object 50.

The processing unit 16 includes the determining unit 21 and an executing unit 22 as its functions. The determining unit 21 determines whether the thought information of the user acquired by the brain-wave acquiring unit 11 and restored by the brain wave decoder 12 is a brain wave corresponding to two different commands of the first command (execution command) and the second command (image command). The determining unit 21 determines whether a brain wave acquired by the brain wave acquiring unit 11 is a brain wave corresponding to the second command representing an action of operating the operating member for a predetermined amount (for example, 25% of the entire distance) or more set in advance.

An operation control method performed by the operation control device 10 will be explained. FIG. 3 is a flowchart illustrating a flow of the operation control device according to the second embodiment.

As illustrated in FIG. 1 and FIG. 3, processing at steps S11 to S15 and steps S20 to S23 are similar to the first embodiment, and explanation thereof is omitted.

At step S16, the determining unit 21 determines whether a brain wave corresponding to the second command (image command) is detected. That is, the determining unit 21 determines whether brain information of an image of an action of the user moving the movable portion of the operating member moves from the "OFF" position to the "ON" position is detected. The determining unit 21 compares the thought information of the user restored by the brain wave decoder 12 and the second command stored in the storage unit 15, and when it is determined that the thought information of the user does not match the second command (NO), returns to step S14, and continues the processing.

On the other hand, when it is determined that the thought information of the user matches the second command stored in the storage unit 15 (YES), the determining unit 21 shifts to step S31. At step S31, the determining unit 21 determines whether an image detected as the second command (image command) is an image of an action in which the movable portion of the operating member moves for a predetermined amount. When it is determined that the image detected as the second command (image command) is not the image of an action in which the movable portion of the operating member moves for the predetermined amount (NO), the determining unit 21 returns to step S14, and continues the processing.

In this case, the processing unit 16 may display that a moving amount of the operating member is not sufficient on the display unit 18 to the user by controlling the display control unit 17. The display control unit 17 may display, for example, a message to prompt a recall of the second command, such as "please recall an image of moving the operating member for the predetermined amount or more", on the display unit 18.

On the other hand, when it is determined that the image detected as the second command (image command) is an image of an action in which the movable portion of the operating member moves for the predetermined amount or more (YES), the determining unit 21 stores the second command in the image command buffer 14, determining that the thought information of the user is the second command. That is, the determining unit 21 stores the detected second command in the image command buffer 14 when brain information of an image of an action in which the movable portion of the operating member is moved from the "OFF" position to the "ON" position for the predetermined amount or more by the user is detected.

At step S17, the determining unit 21 determines whether the first command determined at step S12 and stored in the execution command buffer 13, and the second command determined at steps S16 and S17 and stored in the image command buffer 14 are the first command and the second command, the relevance of which is associated in advance. When the determining unit 21 determines that the first command and the second command are not associated (NO), it returns to step S14. When the determining unit 21 determines that the first command and the second command are associated (YES), it shifts to step S18.

At step S18, the executing unit 22 executes processing corresponding to the first command. That is, the executing unit 22 transmits a control signal corresponding to the processing of the first command to the operation object 50 by the communication unit 19, to actuate the operation object 50. At step S19, the processing unit 16 displays that the first command has been executed on the display unit 18 to the user by controlling the display control unit 17. The display control unit 17 displays a message indicating that the first command has been executed, such as "the speed-up command is executed", on the display unit 18.

Effects

In the present embodiment, the brain-wave acquiring unit (brain-information acquiring unit) 11 that acquires brain information of a user, the determining unit 21 that determines whether brain information acquired by the brain-wave acquiring unit 11 is brain information corresponding to the first command representing an operation to operate the operation object 50 and brain information corresponding to the second command representing an action of operating the operating member, and the executing unit 22 that executes processing corresponding to the first command when the determining unit 21 determines that brain information corresponding to the first command and brain information corresponding to the second command are acquired are included.

Therefore, when brain information corresponding to the first command and brain information corresponding to the second command are acquired, by executing processing corresponding to the first command, the operation object 50 is actuated. That is, even when brain information corresponding to the first command representing an operation is acquired, the processing corresponding to the first command is not executed unless brain information corresponding to the second command indicating an intention to execute the operation is acquired. Therefore, a content of the first command and execution timing are more safely and accurately activated, and an appropriate brain wave command can be executed without being affected by an irrelevant stimulus.

Moreover, because the determining unit 21 determines whether it is an image command representing an action operating the operating member as the second command, an intention to operate the operation object 50 of the user can be accurately detected.

Furthermore, in the present embodiment, the first command is a command based on the language system indicating an operation to operate the operation object 50, and the second command is a command based on the image system representing an intention to execute the operation of the operation object 50. Therefore, by acquiring brain information corresponding to the second command, it is possible to confirm the intention of the user to execute the operation of the operation object 50, and an appropriate brain wave command can be executed.

Moreover, in the present embodiment, the determining unit 21 determines whether a brain wave acquired by the brain-wave acquiring unit 11 is brain information corresponding to the second command representing an action of operating the operating member for a predetermined amount set in advance or more. Therefore, an intention of the user to operate the operation object 50 can be detected accurately, and an appropriate brain wave command can be executed.

The operation control device 10 according to the present invention has so far been explained, but other than the embodiments described above, it may be implemented in various different embodiments.

The illustrated respective components of the operation control device 10 are of functional concept, and it is not necessarily required to be configured physically as illustrated. That is, specific forms of the respective devices are not limited to the ones illustrated, and all or some thereof can be configured to be distributed or integrated functionally or physically in arbitrary units according to various kinds of processing loads, usage conditions, and the like of the respective devices.

The configuration of the operation control device 10 is implemented, for example, by a program loaded on a memory or the like as software. In the embodiment described above, it is explained as functional blocks implemented by coordination of the hardware or software. That is, these functional blocks can be implemented by various forms only by hardware, only by software, or by a combination of those.

The components described above include those easily conceivable by a person skilled in the art, and those practically the same. Furthermore, the components described above can be combined as appropriate. Moreover, various omissions, replacements, and alterations of configuration are possible within a range not departing from a gist of the present invention.

The operation control device, the operation control method, and the computer program of the present disclosure are applicable to, for example, a brain-machine interface.

The computer program for implementing the operation control method according to the present disclosure may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present disclosure, an appropriate brain wave command can be executed without being affected by an irrelevant stimulus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An operation control device comprising:
a brain-information acquiring unit configured to acquire brain information of a user;
a determining unit configured to determine whether the brain information acquired by the brain-information acquiring unit includes brain information corresponding to a first command representing an operation to operate an operation object and brain information corresponding to a second command representing an action to operate an operating member; and
an executing unit configured to execute processing corresponding to the first command when the determining unit determines that the brain information correspond- ing to the first command and the brain information corresponding to the second command are acquired, wherein the first command is a command based on a language system indicating an operation to operate the operation object, and the second command is a command based on an image system representing an intention to execute the operation of the operation object.

2. The operation control device according to claim 1, wherein the determining unit is configured to determine whether the brain information acquired by the brain-information acquiring unit includes brain information corresponding to the second command representing an action to operate the operating member for a predetermined amount set in advance or more.

3. An operation control method comprising:

acquiring brain information of a user;

determining whether the acquired brain information includes brain information corresponding to a first command based on a language system representing an operation to operate an operation object and brain information corresponding to a second command based on an image system representing an action to operate an operating member; and executing processing corresponding to the first command when it is determined that the brain information corresponding to the first command and the brain information corresponding to the second command are acquired.

4. A non-transitory computer-readable storage medium storing a computer program causing a computer to execute:

acquiring brain information of a user;

determining whether the acquired brain information includes brain information corresponding to a first command based on a language system representing an operation to operate an operation object and brain information corresponding to a second command based on an image system representing an action to operate an operating member; and executing processing corresponding to the first command when it is determined that the brain information corresponding to the first command and the brain information corresponding to the second command are acquired.

* * * * *